United States Patent [19]
Flowers et al.

[11] Patent Number: 5,966,254
[45] Date of Patent: Oct. 12, 1999

[54] VEHICLE MIRROR CUTLINE SEAL GASKET

[75] Inventors: Jonathon A. Flowers, Goodrich; John D. Youngs, Southgate, both of Mich.

[73] Assignee: UT Automotive Dearborn, Inc., Dearborn, Mich.

[21] Appl. No.: 08/884,881

[22] Filed: Jun. 30, 1997

[51] Int. Cl.⁶ ............................. G02B 5/08; G02B 7/182
[52] U.S. Cl. .................... 359/841; 359/872; 359/873; 359/876
[58] Field of Search ..................... 359/841, 872, 359/876, 873, 877

[56] References Cited

U.S. PATENT DOCUMENTS

| | | | |
|---|---|---|---|
| 3,892,417 | 7/1975 | Clayton | 277/207 R |
| 4,915,485 | 4/1990 | Ogasawara | 359/841 |
| 5,432,641 | 7/1995 | Mochizuki | 359/841 |
| 5,517,367 | 5/1996 | Kim et al. | 359/864 |

Primary Examiner—Cassandra Spyrou
Assistant Examiner—Mohammad Y. Sikder
Attorney, Agent, or Firm—Howard & Howard

[57] ABSTRACT

A rear view exterior mirror mount assembly for a vehicle includes a sealing device that seals off an interface between the mirror mount and a moveable shell to eliminate wind noise. The shell can be pivoted relative to the remainder of the vehicle from a normal viewing position to a folded position. In the normal viewing position, the interface between the shell and the mirror mount includes a gap that is sealed off by a sealing member in the form of a resilient gasket. The sealing member includes a mounting surface that preferably is adhesively secured to a contoured surface on the shell. At least one lip member extends away from the mounting surface and across the gap at the interface between the shell and the mirror mount when the mirror is in the normal viewing position.

12 Claims, 2 Drawing Sheets

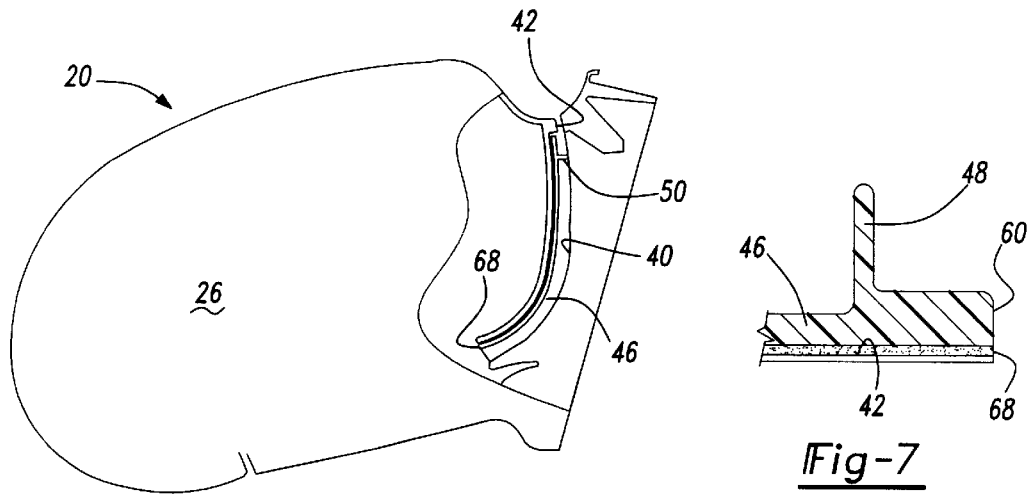
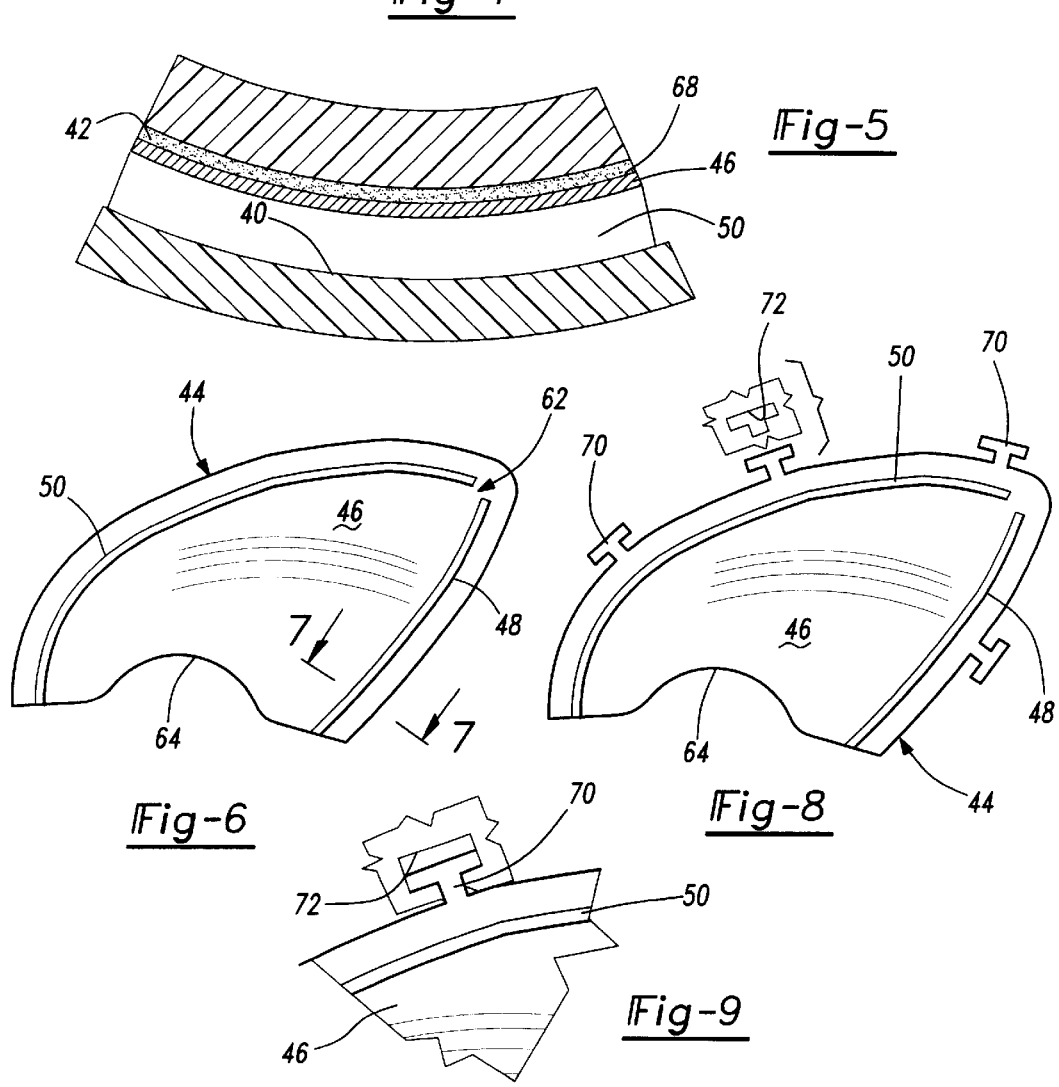

VEHICLE MIRROR CUTLINE SEAL GASKET

BACKGROUND OF THE INVENTIONS

This invention generally relates to a device for reducing wind noise introduced at the interface between a rear view mirror and the body of a vehicle.

Modern day vehicles and automobiles typically include three rear view mirrors. One of the rear view mirrors is mounted within the vehicle while the other two are typically mounted on the exterior of the vehicle at the lower front end of the windows on either side. Exterior-mounted rear view mirrors come in a variety of shapes and sizes.

More recently, for stylistic and aerodynamic reasons, contoured housings and mounting pieces have been developed. In some instances, the exterior rear view mirror housing is made from a single, solid piece of material and remains in a fixed position relative to the door upon which it is mounted. While such an arrangement is satisfactory in some applications, it is not without drawbacks. For example, it is often desirable to have the mirror housing be collapsible or moveable relative to the remainder of the vehicle body. Such a feature can be useful, for example, when relatively minor contact is made with another object so that the mirror housing moves in response to the impact rather than being broken.

Providing a contoured mirror mounting arrangement that also has the feature or advantage of being moveable relative to the vehicle has not been satisfactorily achieved. Prior to this invention, the requirement of having moving parts has introduced structural features that present certain problems. For example, having a moveable mirror mounting shell necessarily introduces an interface between that shell and the remainder of the vehicle body. That interface provides the possibility for wind noise to be generated while driving the vehicle, especially at higher speeds. Wind noise is recognized by those in the vehicle industry as being an undesirable disturbance or annoyance to drivers and, therefore, those in the industry are making attempts to eliminate it.

This invention is an arrangement that provides a stylistic, aerodynamic, contoured mirror mounting arrangement that has the advantage of a moveable mirror housing and eliminates the presence of wind noise that would otherwise be generated by such an arrangement.

SUMMARY OF THE INVENTION

In general terms, this invention is a sealing device that seals off an interface between a moveable mirror mounting housing and a mirror mount that remains stationary relative to the vehicle. The housing and mirror mount are contoured to provide an aerodynamic and stylistic appearance. The housing is moveable relative to the mirror mount and the interface between those two pieces is sealed off using a gasket-like sealing member that prevents airflow through that interface and thereby eliminates the presence of wind noise that would otherwise be generated.

In general terms, this invention includes three basic parts. A mirror mount is supported on the vehicle body and has a contoured portion and a base portion that extends generally away from the contoured portion, which remains fixed relative to the vehicle body. A shell is pivotally supported on the mirror mount base portion and is adapted to house the exterior rear view mirror. The shell has a contoured surface adapted to generally conform to the contoured portion of the mirror mount. The shell can be pivoted into a plurality of positions including a first position where the shell contoured surface is generally aligned with and adjacent to the contoured portion. At least one other position is available where the shell contoured surface is not aligned with the contoured portion on the mirror mount and the shell appears to be in a folded position relative to the vehicle body. The sealing member seals off the interface between the shell contoured surface and the contoured portion on the mirror mount when the shell is placed in the first position, which is typically used by a driver to be able to see out of the rear view mirror.

In the preferred embodiment, the sealing member is a gasket-like member that is made from a resilient material such as rubber. The sealing member includes a mounting surface that is adapted to be supported on either the contoured surface of the shell or the contoured portion of the mirror mount. At least one lip member extends generally away from the mounting surface and extends across the interface between the shell and the mirror mount so that airflow is not permitted through the interface and wind noise is eliminated.

The various features and advantages of this invention will become apparent to those skilled in the art from the following detailed description of the currently preferred embodiment. The drawings that accompany the detailed description can be described as follows.

BRIEF DESCRIPTION OF THE DRAWINGS

FIG. 4 is a partial, cross-sectional view of the embodiment of FIG. 1.

FIG. 5 is a cross-sectional view taken along the lines 5—5 of FIG. 1.

FIG. 6 is a front elevational view of the sealing member designed according to this invention.

FIG. 7 is a cross-sectional view taken along the lines 7—7 of FIG. 6.

FIG. 8 illustrates another embodiment of the sealing member of this invention.

FIG. 9 is an illustration of a selected portion of the embodiment of FIG. 8 showing how the sealing member of that embodiment is mounted into a selected position.

DETAILED DESCRIPTION OF THE PREFERRED EMBODIMENT

Figure 1:
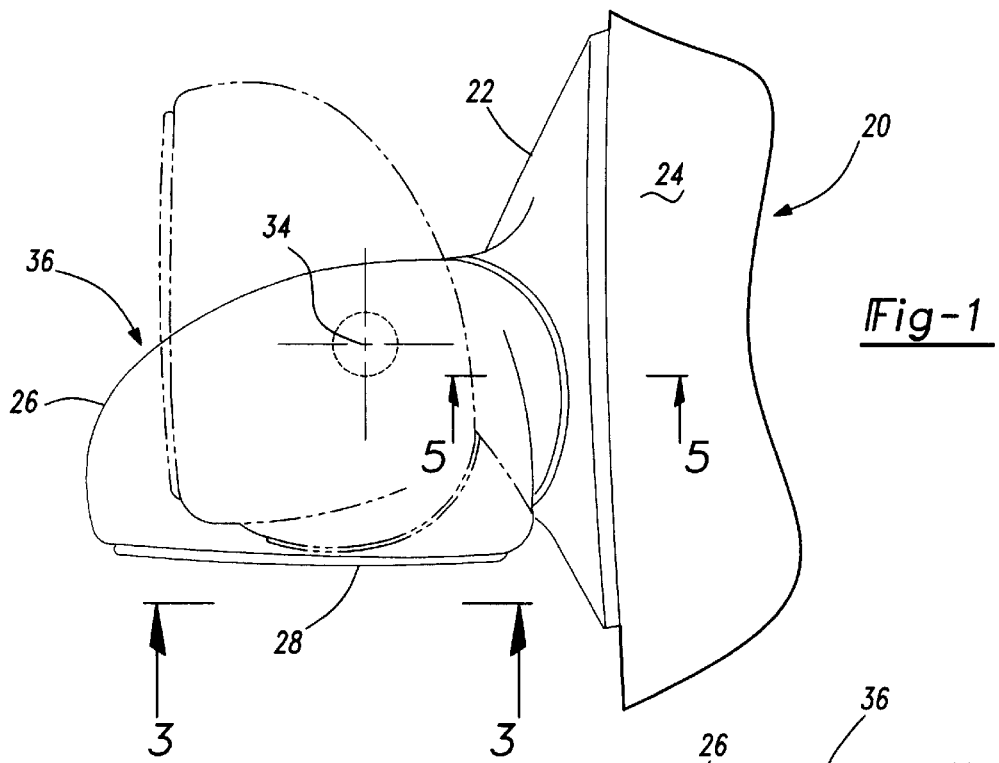
FIG. 1 is a top elevational view of a rear view mirror mounting assembly designed according to this invention.

FIG. 1 illustrates a vehicle mirror assembly 20 that includes a mirror mount 22, which is supported on a portion 24 of the vehicle body such as the front driver's side or passenger door. A mirror housing shell 26 houses the rear view mirror 28, which is utilized in a conventional manner.

Figure 2:
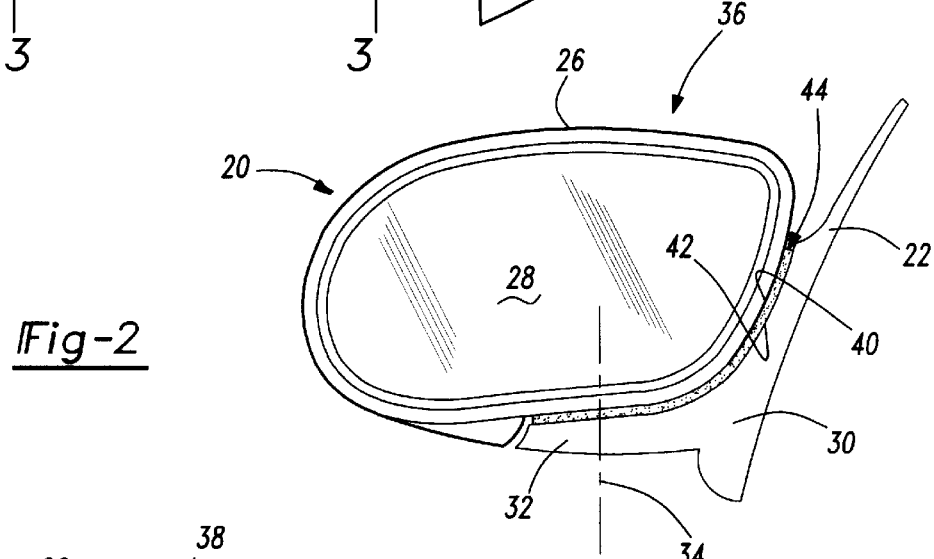
FIG. 2 is a side elevational view of the embodiment of FIG. 1.
Figure 3:
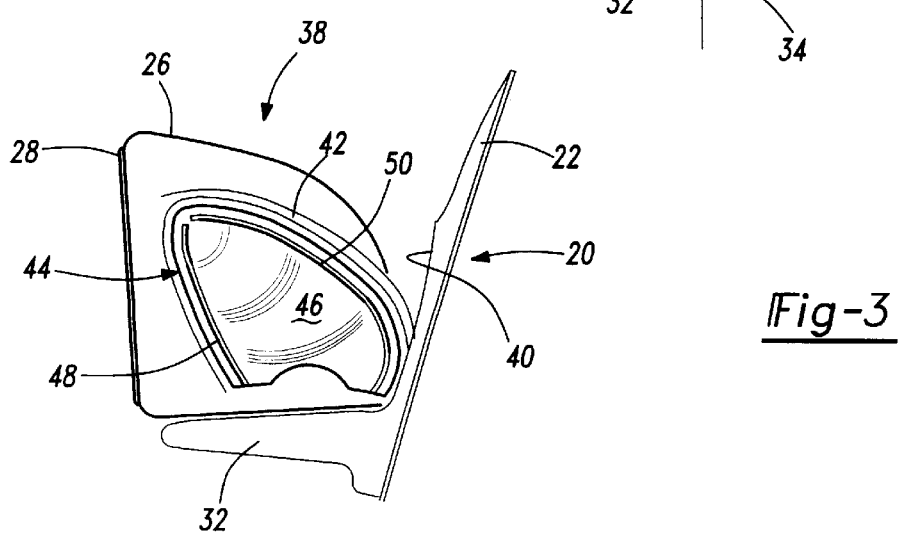
FIG. 3 is a side elevational view taken along the lines 3—3 in FIG. 1.

As best shown in FIGS. 2 and 3, the mirror mount 22 includes a contoured portion 30 that is received against and at least partially conforms to the exterior of the vehicle body. A base portion 32 extends generally away from the contoured portion 30 preferably in a generally horizontal direction. The housing 26 is pivotally supported on the base portion 32 so that the shell 26 can be pivoted about the pivot axis 34, which is schematically illustrated in FIGS. 1 and 2. The configuration of the housing 26 and the base portion 32 preferably includes an arrangement where the housing 26 is spring biased into the position illustrated in FIGS. 1 and 2 so that the housing is maintained in a stable position during normal driving conditions. Such a spring biasing arrangement is well known to those skilled in the art and need not be further described in this specification.

The normal viewing position of the mirror 28 is illustrated at 36 in FIGS. 1 and 2. The shell 26 can be pivoted, however, into a variety of other positions including the position 38 that is illustrated in FIG. 3 and illustrated in phantom in FIG. 1. The housing 26 could also be pivoted, for example, into a position that is 180 degrees away from the position 38.

The contoured portion of the mirror mount 22 includes a generally concave contoured surface 40. A corresponding contoured, generally convex surface 42 on the shell 26 is received adjacent to the contoured surface 40 when the shell is placed in the first position, illustrated at 36. Although the surface 40 generally conforms to the surface 42, there is a gap at the interface between those two surfaces. That gap allows for wind noise to be generated as air flows through that interface under normal driving conditions.

This invention includes a sealing member 44 that is provided within the gap at the interface between the shell 26 and the mount 22. As best seen in FIGS. 3, 4 and 6, the sealing member 44 includes a mounting surface 46 that is conformingly received on the contoured surface 42 of the shell 26. The sealing member 44 also could be mounted on the contoured surface 40 of the mirror mount 22. The presently preferred embodiment includes mounting the sealing member on the shell 26. A first lip member 48 and a second lip member 50 extend generally away from the mounting surface 46. The lip member 48 and 50 extend across the gap at the interface between the contoured surfaces 40 and 42 when the shell 26 is placed in the first position 36. The lip members 48 and 50 preferably include a height that is greater than the average gap size that is experienced during normal production. Since the height of each lip is slightly greater than the size of the gap at the interface, the lip members are slightly biased into a sealing position when the shell 26 is placed in the first position. A slight bias is preferred on the lip members so that they remain in a sealing position even though wind resistance may be experienced under high speed driving conditions, for example.

As best seen in FIGS. 6 and 7, the lip members 48 and 50 preferably are spaced slightly inward from an edge 60 on the support surface 46. The lip members 48 and 50 preferably are separated by a slight gap 62 that allows each lip member to flex and correspond to the contoured surface 42 on the shell 26. A single continuous lip member can be provided, however, a slight gap 62 is preferred. Further, a cut-out relief notch 64 preferably is provided along a third side of the sealing member 44. The relief notch 64 allows the support surface 46 to easily conform to the contoured surface 42 in a more flush manner.

As best seen in FIGS. 5 and 7, a layer of adhesive 68 preferably is provided for mounting the sealing member 44 on the contoured surface 42 of the shell 26. Any suitable adhesive can be used that is able to withstand elements such as rain water and that will exhibit satisfactory adhesive qualities over the normal expected life of a vehicle. Those skilled in the art will be able to chose a commercially available adhesive.

Although adhesive is the preferred way of mounting the sealing member, alternatives are within the scope of this invention. For example, FIG. 8 illustrates a sealing member 44 that includes a plurality of tabs 70. The tabs 70 are received in corresponding slots or openings 72 within the shell 26. The arrangement or shape of the tabs 70 can be varied depending on the material characteristics and any restraints provided by a particular configuration.

The foregoing description is exemplary rather than limiting in nature. The currently preferred embodiment has been described but those skilled in the art may decide that variations and modifications are possible. Such changes do not necessarily depart from the purview and spirit of this invention. Therefore, the scope of legal protection given to this invention can only be determined by studying the following claims.

We claim:

1. A vehicle mirror assembly, comprising:

a mirror mount that is supported on a vehicle body, said mirror mount having a contoured portion and a base portion that extends generally away from said contoured portion and the vehicle body;

a shell that is pivotally supported on said mirror mount base portion and adapted to house a mirror, said shell having a contoured surface adapted to generally conform to said mirror mount contoured portion, said shell being pivotable into a plurality of positions including a first position wherein said shell contoured surface is generally aligned with an adjacent to said mirror mount contoured portion and a second position wherein said shell contoured surface is spaced from and not aligned with said mirror mount contoured portion; and a sealing member that seals off an interface between said shell contoured surface and said mount contoured portion when said shell is in said first position and wherein said sealing member includes a generally flexible mounting surface that is supported directly on one of said contoured surface or said contoured portion and a first generally flexible and resilient lip member that extends generally away from said mounting surface and extends only along a first side of said interface, said first lip member having a first dimension and said interface between said contoured portion and said contoured surface having a second dimension such that said first lip member is biased into a sealing position when said shell is in said first position and wherein said sealing member includes a second generally flexible and resilient second lip member extending only along a second side of said interface such that said first lip member is separate from said second lip member.

2. The assembly of claim 1, wherein said first dimension is slightly greater than said second dimension.

3. The assembly of claim 1, wherein said mounting surface is supported on said contoured surface by an adhesive disposed between said mounting surface and said contoured surface.

4. The assembly of claim 1, wherein said mounting surface is supported on said contoured surface by a plurality of tab members that extend away from said mounting surface and through at least a portion of said contoured surface.

5. The assembly of claim 1, wherein said sealing member mounting surface is supported on said shell contoured surface by a plurality of tabs that extend through a corresponding plurality of openings in said shell.

6. The assembly of claim 1, wherein said mounting surface includes a relief notch along one side of said mounting surface, said relief notch facilitating mounting said mounting surface flush along one of said contoured portion or said contoured surface.

7. A vehicle mirror assembly, comprising:

a mirror mount that is supported on a vehicle body, said mirror mount having a contoured portion and a base portion that extends generally away from said contoured portion and the vehicle body;

a shell that is pivotally supported on said mirror mount base portion and adapted to house a mirror, said shell having a contoured surface adapted to generally conform to said mirror mount contoured portion, said shell being pivotable into a plurality of positions including a first position wherein said shell contoured surface is generally aligned with an adjacent to said mirror mount contoured portion and a second position wherein said shell contoured surface is spaced from and not aligned with said mirror mount contoured portion; and a sealing member having a generally flat and resilient mounting surface having a perimeter that includes three sides, a first resilient lip extending generally away from said mounting surface and extending along a substantial portion of a first one of said three sides such that said first lip seals off a first portion of the interface that is coincident with said first lip when said shell is in said first position, a second resilient lip extending generally away from said mounting surface and extending along a substantial portion of a second one of said three sides such that said second lip seals off a second portion of the interface that is coincident with said second lip when said shell is in said first position and wherein a gap exists between said first lip and said second lip near an intersection of said first and second sides.

8. The assembly of claim 7, wherein a third one of said sides includes a cut-out relief that is operative to allow said mounting surface to seat flush against a receiving surface on one of the mirror shell or the mirror mount.

9. The assembly of claim 7, further comprising a layer of adhesive disposed between said mounting surface and one of said contoured surface or said contoured portion.

10. The assembly of claim 9, wherein a third one of said sides includes a cut-out relief that is operative to allow said mounting surface to seat flush against said contoured portion.

11. A vehicle mirror assembly, comprising:

a mirror mount that is supported on a vehicle body, said mirror mount having a contoured portion and a base portion that extends generally away from said contoured portion and the vehicle body;

a shell that is pivotally supported on said mirror mount base portion and adapted to house a mirror, said shell having a contoured surface adapted to generally conform to said mirror mount contoured portion, said shell being pivotable into a plurality of positions including a first position wherein said shell contoured surface is generally aligned with an adjacent to said mirror mount contoured portion and a second position wherein said shell contoured surface is spaced from and not aligned with said mirror mount contoured portion;

a sealing member that seals off an interface between said shell contoured surface and said mount contoured portion when said shell is in said first position, said sealing member including a generally flexible mounting surface having a perimeter with three sides, a lip extending generally away from said mounting surface and along at least a substantial portion of two of said sides, a third one of said sides including a cut-out relief; and an adhesive securing said mounting surface to said shell contoured portion and said cut-out relief being operative to permit said mounting surface to seat flush on said contoured portion.

12. The assembly of claim 11, wherein said sealing member includes a first lip extending only along a substantial portion of a first one of said three sides and a second lip that is separate from said first lip and extends only along a substantial portion of a second side of said three sides.

* * * * *